Dec. 4, 1951 — H. D. BARBER — 2,577,504
LOAD RETAINER
Filed Feb. 15, 1947 — 3 Sheets-Sheet 1
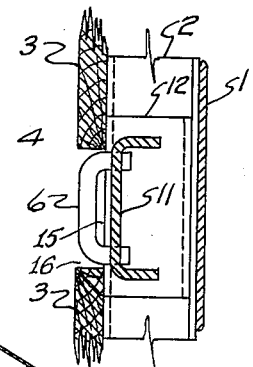
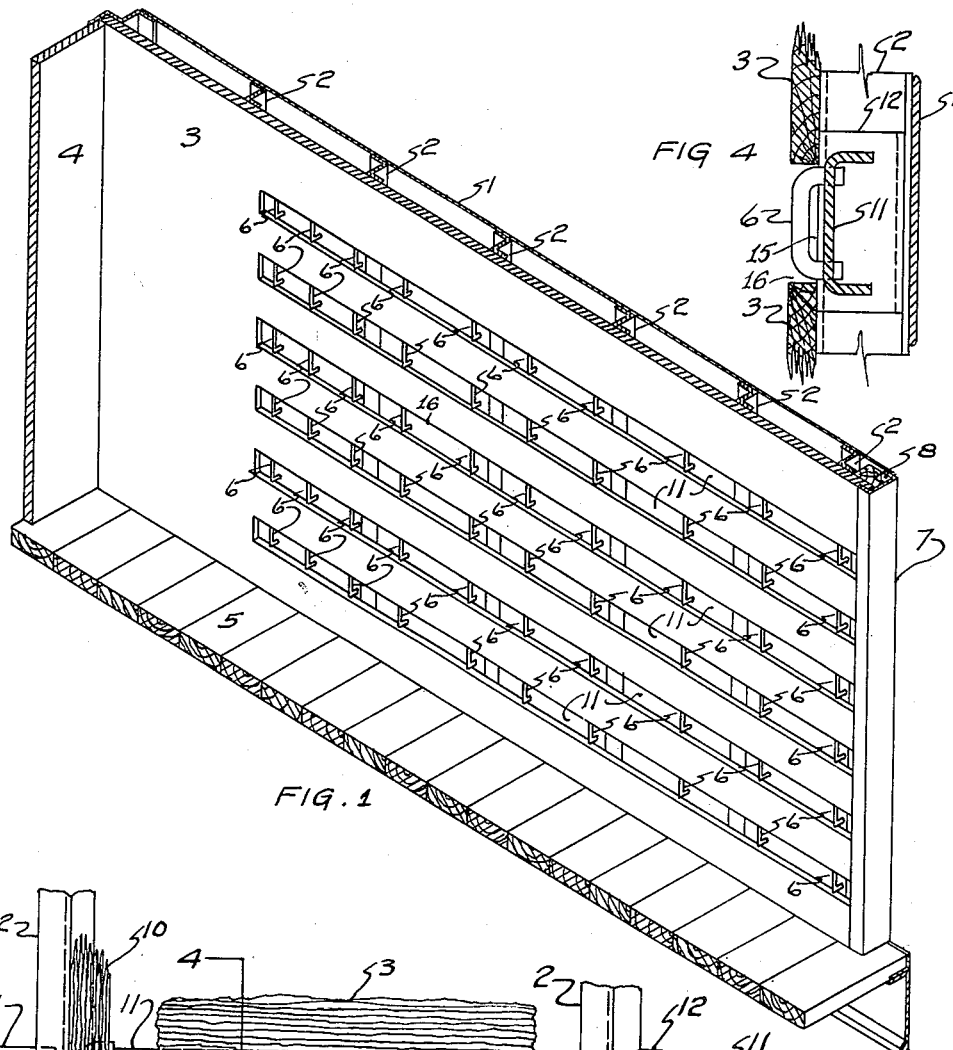
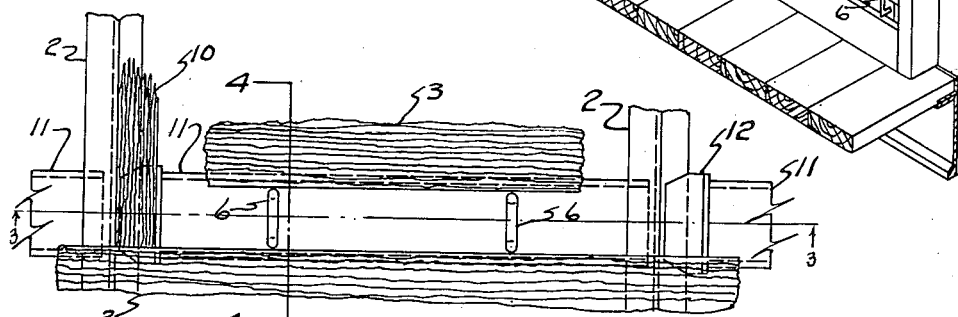
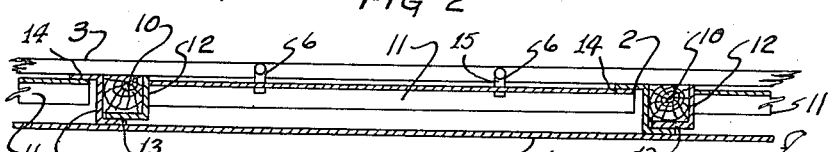

Dec. 4, 1951   H. D. BARBER   2,577,504
LOAD RETAINER
Filed Feb. 15, 1947   3 Sheets-Sheet 2

Dec. 4, 1951  H. D. BARBER  2,577,504
LOAD RETAINER
Filed Feb. 15, 1947  3 Sheets-Sheet 3
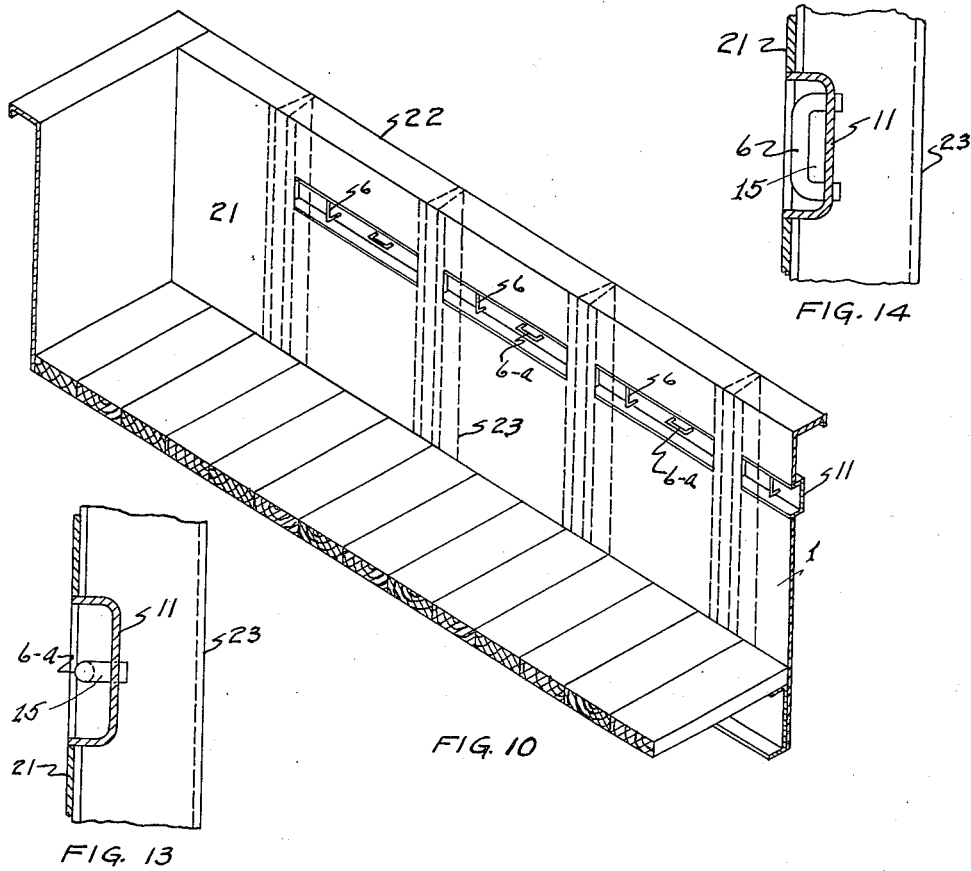
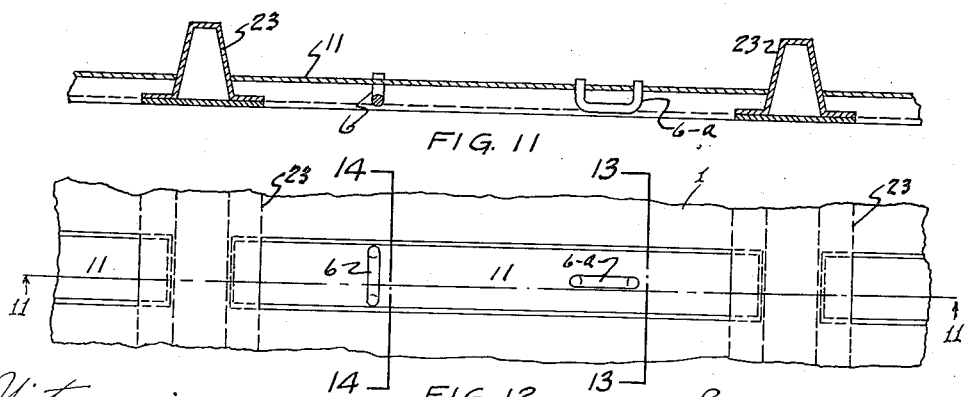

Patented Dec. 4, 1951

2,577,504

UNITED STATES PATENT OFFICE 2,577,504

LOAD RETAINER

Harold Dale Barber, Shaker Heights, Ohio

Application February 15, 1947, Serial No. 728,873

3 Claims. (Cl. 105—369)

My invention relates to load retaining and securing means, and more particularly to means of this character which may be applied to railroad rolling stock or other cargo carrying vehicles.

It is one of the objects of the present invention to secure a cargo or load or any part thereof in place in a vehicle and to prevent shifting or moving of the same while the vehicle is in motion, thus insuring against damage to the load or to the vehicle which might otherwise occur as a result of load movement.

Another object of the invention resides in a cargo or load positioning and anchoring means which may be installed in the vehicle without the use of nails or other fastening members driven into the side walls of the vehicle. Such fasteners are not reliable under load, are destructive to the vehicle walls and are otherwise unsatisfactory in use.

A further object of my invention is to provide load retaining means of this character by which rubbing or chafing of flat, round or other shaped packages or articles included in load against the retaining means is prevented.

A still further object resides in preventing bulk freight becoming lodged between the inner and outer sheathings comprising a vehicle wall, as for instance, in a railroad freight car.

Another object consists in more economically utilizing the loading space within a vehicle.

Other objects and advantages of my invention will become more apparent as the following description of several embodiments thereof progresses, reference being made to the accompanying drawings, in which like reference characters are employed to designate like parts throughout the same.

In the drawings:

Figure 1 is a perspective view of one side of a box or house car showing the invention applied in use.

Figure 2 is a fragmentary front view of a portion of the car wall shown in Figure 1.

Figure 3 is a section taken in the direction of the arrows 3—3 of Figure 2.

Figure 4 is an enlarged section taken on line 4—4 of Figure 2.

Figure 10 is a perspective view of a section of a gondola car showing the manner of application of the invention to this type of car.

Figure 11 is a section taken on line 11—11 of Figure 12.

Figure 12 is a fragmentary front view of a side wall of the gondola car showing the invention applied.

Figure 13 is an enlarged section taken on line 13—13 of Figure 12, and

Figure 14 is an enlarged section taken on line 14—14 of Figure 12.

Figure 8:
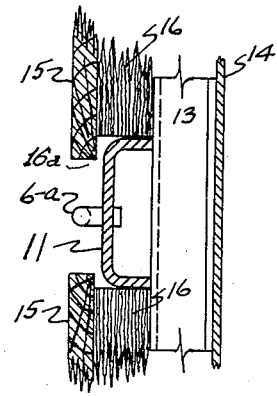
Figure 8 is an enlarged section taken on line 8—8 of Figure 6.
Figure 9:
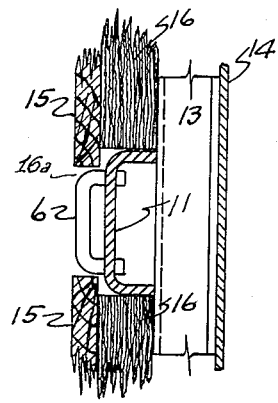
Figure 9 is a section taken on line 9—9 of Figure 6.

While I have shown in the drawings three applications of the invention to railway rolling stock, such as the house or box car, refrigerator car and the gondola car, it is intended that the invention may equally well be applied to other vehicles, such as aircraft, trucks or even ships without departing from the spirit or intent thereof.

The invention consists essentially in the provision of one or more channels or sturdy rails of desirable weight and size built into the walls or partitions of a vehicle, and each carrying a plurality or series of tie bars or holders rigidly secured thereto in spaced relation along the channels as will more clearly be pointed out hereinafter.

Referring first to Figures 1 to 4 inclusive in which I have illustrated the invention applied to a house or box car, the opposite side walls of the car comprise an outer and an inner sheathing 1 and 3 respectively, spaced apart by means of rigid upright supporting members 2 preferably of steel. Each of the upright members 2 may be Z-shaped in cross section to provide parallel walls against which the respective sheathings lie or are fastened. One end wall of the car is shown at 4, while the floor is indicated at 5.

A door post comprises an upright channel 7 housing the upright post 8, there being a similar door post (not shown) spaced therefrom to the right in Figure 1.

Between adjacent upright members 2 there are provided a plurality of channels 11 opening outwardly toward the outer sheathing 1 and arranged one above the other in the fashion indicated in Figure 1, and each channel carries one or more substantially U-shaped tie bars 6.

The tie bars are secured to the channels by passing the arms of these bars through openings provided in the channels and then welding the ends of the arms projecting through the openings to the inner face of the channel. The channels 11 are welded or riveted to the upright steel side posts 2 or may be provided with an angle plate 12 at one end overlying the upright posts 10 but underlying one of the flanges of the adjacent supporting member 2 as at 13 in Figure 3. The opposite end of each channed may be welded directly to another flange of its adjacent supporting member 2 as at 14 in Figure 3.

It is to be noted that the tie bars 6, while projecting outwardly of the channels to which they are secured to provide a space 15 therebetween for receiving a band, strap, wire or other fastening or tieing means, lie flush with the inner surface of the sheathing 3, there being elongated openings 16 in the sheathing and opposite the bars 6 to expose the tie bars for use.

One advantage of the present invention as exemplified in Figures 1 to 4, is that the tie bars 6 nearest the door post 7 can be so located and arranged as to permit grain doors (not shown) to be set in the door space and held in place by the use of strapping, wire or the like, tied to one or more of the tie bars on one side of the door post 7, overlying the grain door, and tied to tie bars near the opposite door post. This permits the application of grain doors to box cars without destruction or mutilation of the door posts as when nails are driven thereinto to hold such doors in place.

When a box or house car is equipped with the invention as illustrated in Figures 1 to 4 inclusive, shipments may be secured in the car in a variety of different ways by the use of steel strapping, wire, rope or the like and tying or binding the same to the selected tie bars and to the cargo in a manner preventing shifting or moving of the cargo when the vehicle is in motion.

Referring now to Figures 5 to 9 inclusive, which illustrate the invention applied to a refrigerator car, the construction is somewhat similar to that form shown in Figures 1 to 4 inclusive but differs in some respects which will be described as follows.

Figure 6:
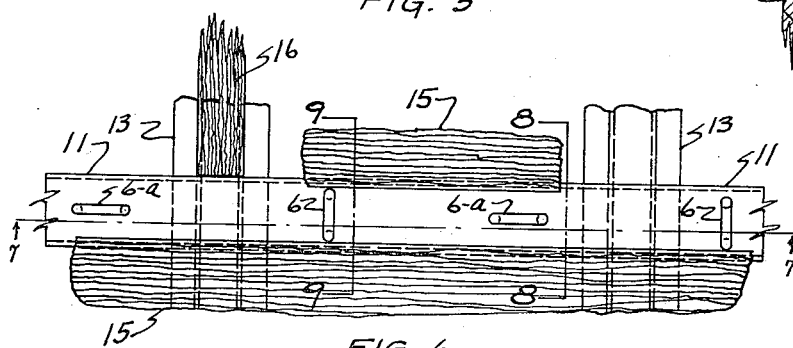
Figure 6 is an enlarged fragmentary front view of a portion of the car side wall showing the invention.
Figure 7:
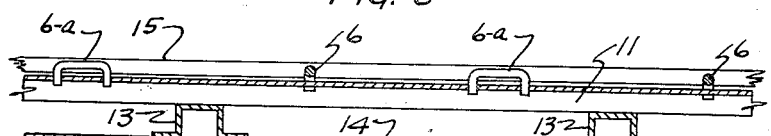
Figure 7 is a section taken on line 7—7 of Figure 6.

The outer sheathing 14 lies against the flanges of the vertical channel members 13 and may be secured thereto by welding or by rivets. The vertical channels 13 are spaced apart at intervals as shown in Figures 6 and 7 presenting forward aligned faces to which the U-shaped channels 11 carrying the tie bars 6 and 6a are secured by means of welding.

Figure 5:
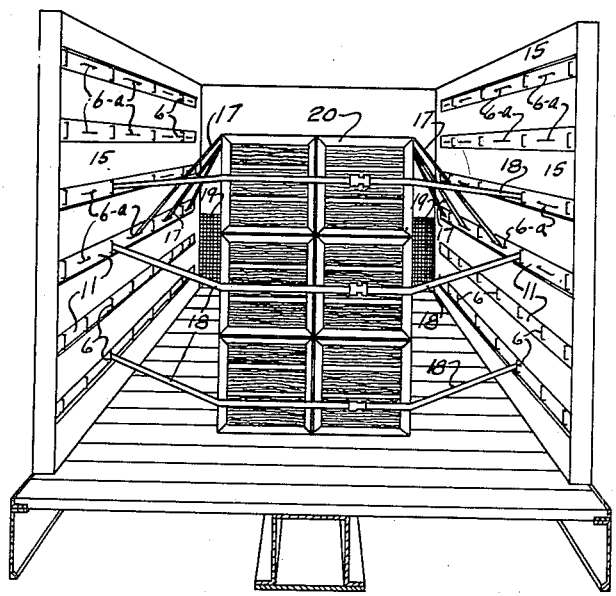
Figure 5 is a perspective view of the interior of a refrigerator car showing the invention applied and the manner of anchoring or retaining a load against movement either vertically or horizontally while the car is in motion.

The channels 11 may run longitudinally of the car side walls as shown in Figure 5, the inner sheathing 15 being secured against the upright wooden posts 16 and overlying the longitudinal edges of the channels 11 but providing a space on opposite sides of the tie bars 6 and 6a as indicated at 16a into which the tie bars 6 and 6a project for purposes of accessibility in anchoring the load in the car.

In this embodiment of my invention it will be noted that the tie bars 6 are vertically secured as by welding to the channels 11, while the tie bars 6a are horizontally arranged and secured, and that I have alternated the horizontal and vertical tie bars in each horizontal series on opposite sides of the car. In this manner a strap or wire or other fastening means 18 engaging the load or cargo 20 under tension and secured to the vertically arranged tie bars 6 will anchor the load against lateral or horizontal movement while the car is in motion, whereas a strap or wire or other fastening means 17 tied or secured to the horizontally arranged tie bars 6a and engaging the cargo 20 under tension as shown in Figure 5 will prevent vertical movement or displacement of the cargo while the car is in motion.

It will be noted that by arranging a plurality of horizontal channels 11, one above the other in spaced relation, each channel carrying a plurality of alternate vertical and horizontal tie bars 6 and 6a, the operator has at his disposal a wide variety of anchoring points as defined by the respective tie bars. Under such circumstances the size or shape of the cargo is immaterial inasmuch as the operator has at his disposal a selection of locations along the channels 11 for placing the fastening members 17 and 18 under tension and securing them so as to provide the utmost security to the cargo against shifting or movement while the vehicle is in motion.

Referring to Figures 10 to 14 inclusive, the invention is illustrated in connection with use on a gondola type of car. In this form of the invention, the channels 11 are secured to the side wall 1 of the car and open inwardly of the car between the upright supports 23, the extremities of the arms of the U-shaped channels lying flush with the wall 1. The tie bars 6 and 6a are secured to the channel 11 in a manner hereinbefore described and are alternated along the channel so that between each vertical tie bar 6 there will be located a horizontal tie bar 6a, it being desirable to have at least one tie bar 6 and one tie bar 6a between adjacent upright supports 23.

From the above description of the several embodiments of my invention, it will be seen that I have provided simple, rigid, and effective means for anchoring a load or cargo in a vehicle against shifting or movement while the vehicle is in motion and that such means is so arranged and associated with the side walls of the vehicle that no obstructions project into the body of the car, that is, the usable storage area of the car. Furthermore, my invention provides effective means for preventing either vertical or horizontal movement of a load in transit without the necessity of driving nails or other driven fastening members into side walls or floor of a car and in the use of the invention in a box car, the same provides means whereby a grain door may be employed and anchored securely into place by use of a strap or wire connecting the tie bars adjacent to each of the door posts of the car and binding the grain door in its place.

Various changes may be made in the details of construction or arrangement of parts without departing from the spirit of the invention or the scope of the appended claims.

I claim:

1. The combination with a vehicle having opposed side walls, of elongated channel members of U-shaped cross-section secured within said walls and disposed in spaced substantially parallel relation, said channel members opening outwardly of the car interior, and a plurality of U-shaped tie bars carried by each of said channel members and accessible from within the vehicle whereby a tie member such as a rope or strap may be secured to selected tie bars on said opposed walls and tensioned against a load therebetween, said U-shaped channels having openings in their base portion for receiving the arms of said U-shaped tie bars, said arms being welded near their ends to said channel base, some of said tie bars being disposed in a vertical direction.

2. The combination with a vehicle having opposed side walls, of elongated channel members of U-shaped cross-section secured within said walls and disposed in spaced substantially parallel relation, said channel members opening outwardly of the car interior, and a plurality of U-shaped tie bars carried by each of said channel members and accessible from within the vehicle whereby a tie member such as a rope or strap may be secured to selected tie bars on said opposed walls and tensioned against a load therebetween, said U-shaped channels having openings in their base portion for receiving the arms of said U-shaped tie bars, said arms being welded near their ends to said channel base, alternate tie bars of each channel being disposed substantially vertically and horizontally respectively with respect to the longitudinal axes of said respective channels.

3. In a vehicle wall construction, a side wall comprising an outer sheathing, an inner sheathing, vertical structural members therebetween, horizontally disposed elongated channel members substantially U-shaped in cross section secured along their free longitudinal edge portions to said vertical structural members and fastening members supported by the base portions of said channels, said inner sheathing being relieved opposite said respective fastening members to thereby make them accessible from within the vehicle, said fastening members comprising U-shaped tie bars, the arm portions thereof passing through said channel base portions and welded thereto, some of said bars extending in a direction substantially parallel with said channels and others thereof disposed substantially vertically with respect to the longitudinal axes of said respective channels.

HAROLD DALE BARBER.

REFERENCES CITED

The following references are of record in the file of this patent:

UNITED STATES PATENTS

| Number | Name | Date |
|---|---|---|
| 642,058 | Worswick | Jan. 23, 1900 |
| 994,822 | Daly | June 13, 1911 |
| 1,247,230 | Daly | Nov. 20, 1917 |
| 2,051,381 | Kivlin | Aug. 18, 1936 |
| 2,056,704 | Anderson | Oct. 6, 1936 |
| 2,170,913 | Rowe | Aug. 29, 1939 |
| 2,226,667 | Love | Dec. 31, 1940 |
| 2,312,119 | Nystrom et al. | Feb. 23, 1943 |
| 2,467,681 | McKinney | Apr. 19, 1949 |